Sept. 6, 1949.　　　　　S. GLAUSER　　　　　2,481,409

FIELD-GLASS AND PROTECTIVE COVER THEREFOR

Filed May 13, 1947

Inventor:
Samuel Glauser

Patented Sept. 6, 1949

2,481,409

UNITED STATES PATENT OFFICE 2,481,409

FIELD GLASS AND PROTECTIVE COVER THEREFOR

Samuel Glauser, Le Locle, Switzerland

Application May 13, 1947, Serial No. 747,711
In Switzerland April 11, 1947

3 Claims. (Cl. 88—32)

The object of the present invention is a field-glass, particularly a pocket size field-glass, characterised in that it comprises an optical system arranged in a casing and a device enabling to cover at least such parts of the optical system, as left uncovered by the casing and forming an integral part of the field-glass.

The drawing represents, by way of example, one executional form of the field-glass according to the invention.

Figures 1, 2:
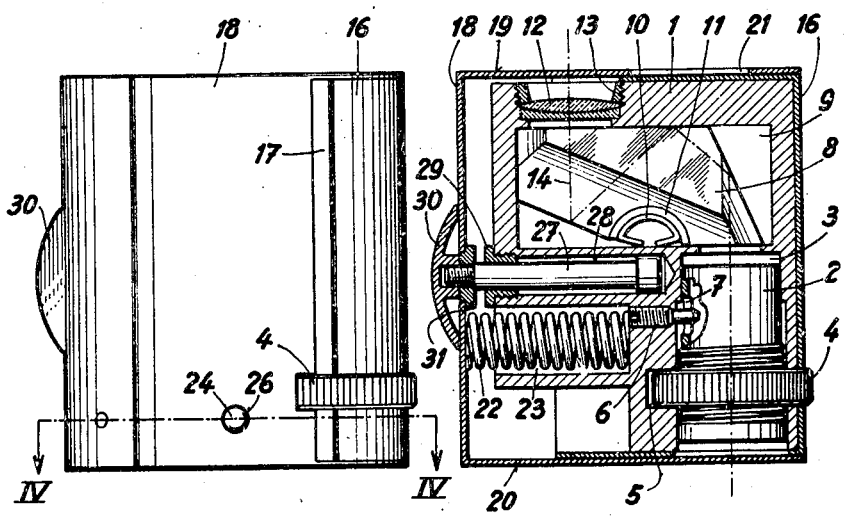
Fig. 1 is an elevation.
Fig. 2 is a section through the axial plane of the lenses.
Figure 3:
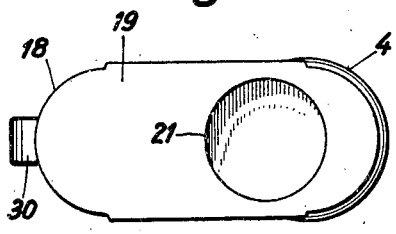
Fig. 3 is a plan.
Figure 4:
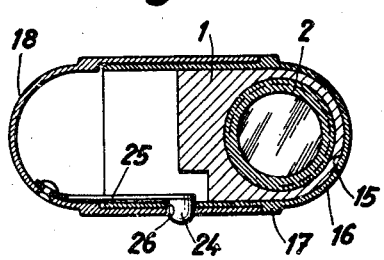
Fig. 4 is a sectional view taken on section line IV—IV of Fig. 1.

The represented field-glass comprises a casing member 1 shaped generally as a square parallelepiped and in which are housed the components forming its optical system, viz.: an eyepiece mounted in a tube 2 arranged to slide in the bore 3 of casing 1, when operating a knurled nut 4 which is lodged in a recess 5 of the casing, a set-screw 6 engaging into a longitudinal groove 7 of tube 2 to prevent the latter from rotating; a prism 8 lodged in a recess or chamber 9 of the casing 1, where it is fastened by means of a bent laminated spring 10 which acts on the prism through a layer 11 made of soft material, rubber for example, and finally an objective 12 fastened in its aperture or seat by means of nut 13. The axis of the optical system is represented by the dash-dotted line 14. The Figures 2 and 4 show that the outlines of the casing depart in their details from the parallelepiped mentioned before. Thus, the small face containing the axis of the eyepiece is a semicylinder. Furthermore, the casing 1 is fixed by non-represented screws in a sheet metal piece or casing shell 16 comprising ridges 17, the purpose of which will be described hereinafter. The assembly of casing 1 and of this piece 16 is mounted telescopically in the protective cover 18, which is also made of sheet-metal. In its retracted position, as represented in the drawing, the end faces 19 and 20 of this protective cover serve to cover the eye-piece and the objective 12, in order to protect them against pointed objects and dust. In the withdrawn position, the face 20 clears the eye-piece, whereas the circular opening 21 provided in the face 19 is moved in front of the objective 12. Now the field-glass is ready for use. The adjusting nut 4 for focussing the eye-piece, always slightly projects outwardly through a slot in the sheet metal piece or shell 16 opposite to the recess 5 of the casing 1, in order to be manipulated with the forefinger and the thumb of the hand holding the field-glass.

A helical spring 22 is lodged in a recess 23 of casing 1, in which it is supported at one end in order to exert by its other end a pressure against the protective cover 18. A push button 24, arranged at the free end of a laminated spring 25 fixed on said cover 18, mutually locks the casing 1 and the cover 18 in the retracted position, by engaging into a hole 26 provided for this purpose in casing shell 16 and in the cover 18. In order to limit the withdrawal or extension, a plunger 27 sliding along a bore 28 of casing 1 is provided, the abutment of said plunger meeting at the end of the stroke an annular nut 29, screwed into the wall of said bore. The cover 18 is fixed to the stem of plunger 27 by means of a nut 30 and a lock nut 31. When it is required to retract the casing 1 into the cover 18, it is pushed home inside the latter which then contacts the ridges or stops 17 of sheet metal piece or shell 16. In order to effect the extension or withdrawal, the button 24 is pressed. It is easily possible to hold the field-glass, to adjust the nut 4 to operate the retraction and the withdrawal with the fingers and the palm of one hand.

The faces of cover 18 sliding on casing shell 16 are connected to each other by a semicylinder made of sheet metal. The shape and the dimensions of the field-glass are such that it may easily be carried in a pocket of a garment.

The field-glass described is only one of the numerous possible executional forms. The protective device could be mounted on the casing by means of pivots for example; it could also comprise lids mounted rotatably on hinges fixed to the casing, or discs pivotally mounted on the casing; it would also be possible to provide diaphragms in front of the parts of the optical system left unprotected by the casing, of the type as used in photographic cameras.

All these protective devices may be adapted to monocular or binocular field-glasses fitted with an optical system similar to or different from the one described in the example.

What I claim is:

1. A telescoping field-glass including the combination of a hollow protective cover which is open at one end; a corresponding casing extending a distance into the cover in retracted position and adapted to be slidably extended a limited distance from the open end thereof; means urging the casing into extended position; manually releasable latch means for retaining said casing in retracted position with respect to said cover; said casing having an aperture extending a short distance into the latter adjacent to the inner end of said casing in one portion thereof and having an open bore extending a predetermined distance into said casing adjacent to the outer end of the latter in an opposite portion thereof, with the central axes of the aperture and bore substantially parallel but spaced apart out of alignment; an optical element seated in said aperture; a second optical element disposed within said bore; said cover having an aperture adjacent to the outer end upon one portion thereof registering with the first mentioned optical element in the aperture of the casing in extended position of the latter, while the open end of the correspondingly opposite portion of said cover simultaneously clears the second optical element in the bore of said casing; and optical means disposed in said casing for conducting light rays from one optical element to the other.

2. A telescoping field-glass including the combination of a hollow protective cover which is open at one end; a corresponding casing extending a distance into the cover in retracted position and adapted to be slidably extended a limited distance from the open end thereof; means urging the casing into extended position; means in said cover engaging with an interior portion of said casing for limiting the extension of the latter to a predetermined extended position with respect to said cover; stop means for limiting the retraction of said casing to a predetermined retracted position in said cover; manually releasable latch means for retaining said casing in retracted position with respect to said cover; said casing having an aperture extending a short distance into the latter adjacent to the inner end of said casing in one portion thereof and having an open bore extending a predetermined distance into said casing adjacent to the outer end of the latter in an opposite portion thereof, with the central axes of the aperture and bore substantially parallel but spaced apart out of alignment; said casing also having an interior chamber extending from the aperture to the bore thereof and communicating with the inner ends of said aperture and bore; an optical element seated in said aperture; a second optical element disposed within said bore; said cover having an aperture adjacent to the outer end upon one portion thereof registering with the first mentioned optical element in the aperture of the casing in extended position of the latter, while the open end of the correspondingly opposite portion of said cover simultaneously clears the second optical element in the bore of said casing; and optical reflecting means disposed in said interior chamber for conducting light rays from one optical element to the other.

3. A telescoping field-glass including the combination of a hollow protective cover which is open at one end; a corresponding casing shell having an open inner end and extending a distance into the cover in retracted position and adapted to be slidably extended a limited distance from the open end thereof; a casing member secured in the casing shell and together therewith forming a casing proper; means urging the casing into extended position; manually releasable latch means for retaining said casing in retracted position in said cover; the casing shell having a pair of ridges upon the opposite sides adjacent to and substantially parallel to the closed end thereof forming stops for the end edges of the open end of said cover to limit the retraction of said casing to a predetermined retracted position; means in said cover engaging with an interior portion of said casing for limiting the extension thereof to a predetermined extended position; said casing having an aperture extending a short distance into the latter adjacent to the inner end of said casing in one portion thereof and having an open bore extending a predetermined distance into said casing adjacent to the outer end of the latter in an opposite portion thereof, with the central axes of the aperture and bore substantially parallel but spaced apart out of alignment; an objective seated in the aperture; an adjustable eyepiece movably disposed within the bore; the casing also having an interior chamber within the casing member thereof extending from the aperture to the bore and communicating with the inner ends thereof; said cover having an aperture adjacent to the outer end upon one portion thereof registering with the first mentioned optical element in the aperture of the casing in extended position of the latter, while the open end of the correspondingly opposite portion of said cover simultaneously clears the second optical element in the bore of said casing; and an optical reflecting member located in the interior chamber for transmitting light rays from said objective to said eyepiece.

SAMUEL GLAUSER.

REFERENCES CITED

The following references are of record in the file of this patent:

UNITED STATES PATENTS

| Number | Name | Date |
|---|---|---|
| 849,409 | Martin | Apr. 9, 1907 |
| 2,169,548 | Zapp | Aug. 15, 1939 |
| 2,223,219 | Mayerovitz | Nov. 26, 1940 |
| 2,390,932 | Fitz | Dec. 11, 1945 |
| 2,407,416 | Gudmundson | Sept. 10, 1946 |

FOREIGN PATENTS

| Number | Country | Date |
|---|---|---|
| 10,484 | Great Britain (1899) | Mar. 24, 1900 |
| 9,889 | Great Britain | Mar. 31, 1904 |